United States Patent
Berckmans et al.

(10) Patent No.: US 7,674,354 B2
(45) Date of Patent: Mar. 9, 2010

(54) STARCH DERIVATIVES FOR USE IN PAPER SIZING AND/OR COATING COMPOSITIONS

(75) Inventors: Marc Charles Florent Berckmans, Brussels (BE); Rudy Roux, Douai (FR)

(73) Assignee: Cargill, Incorporated, Wayzata, MN (US)

( * ) Notice: Subject to any disclaimer, the term of this patent is extended or adjusted under 35 U.S.C. 154(b) by 509 days.

(21) Appl. No.: 11/571,069

(22) PCT Filed: Jun. 15, 2005

(86) PCT No.: PCT/EP2005/006400

§ 371 (c)(1),
(2), (4) Date: Dec. 21, 2006

(87) PCT Pub. No.: WO2006/002761

PCT Pub. Date: Jan. 12, 2006

(65) Prior Publication Data

US 2007/0240839 A1    Oct. 18, 2007

(30) Foreign Application Priority Data

Jul. 1, 2004    (EP)    .................................. 04253975

(51) Int. Cl.
*D21F 11/00*    (2006.01)

(52) U.S. Cl. .................................... 162/135; 106/206.1
(58) Field of Classification Search .................. 162/135; 106/206.1

See application file for complete search history.

(56) References Cited

U.S. PATENT DOCUMENTS 7,446,084 B2 * 11/2008 Barthel et al. ............... 510/296

FOREIGN PATENT DOCUMENTS

| EP | 0 049 009 | 4/1986 |
|----|-----------|--------|
| EP | 1 184 413 | 11/2005 |

* cited by examiner

*Primary Examiner*—Mark Halpern

(57) ABSTRACT

The present invention relates to a method of preparing a starch-based composition, characterized in that it comprises: (a) mixing a starch substrate with sodium perborate; (b) adding water to the mix of step (a) to form a slurry; and (c) pasting the slurry of step (b), provided that the method does not include, between steps (b) and (c), the step of adding an effective amount of hydrolytic enzyme to the slurry. The invention further relates to starch-based compositions prepared in accordance with said method, paper sizing and/or coating compositions comprising said starch-based compositions and paper products treated with said sizing and/or coating compositions.

8 Claims, No Drawings

STARCH DERIVATIVES FOR USE IN PAPER SIZING AND/OR COATING COMPOSITIONS

This application is a 371 of PCT/EP05/06400 filed 15 Jun. 2005.

FIELD OF THE INVENTION

The present invention relates to a method of preparing starch-based compositions comprising the step of mixing a starch substrate with sodium perborate. The invention further relates to the use of such starch-based compositions in paper sizing and/or coating compositions and to the preparation of papers sized and/or coated with such starch-based compositions.

BACKGROUND

Starch is one of the materials most commonly used in paper sizing and paper coating compositions. It can be used, for example, as a thickener, emulsifier or binder. Depending on its role, the starch will have to have specific, pre-determined rheological properties. The desired properties can be achieved by a number of well known starch modification methods including thermal, chemical and enzymatic treatment.

One of the most commonly used starch derivatives is oxidised starches. Oxidised starches are commercially produced by treatment with agents such as sodium hypochlorite. There is a desire in the paper industry, however, to find a chlorine-free alternative to these starches. To this end, the use of starch derivatives, such as dextrins, has been proposed.

Dextrins can be produced by thermal, acid or enzyme modification, with their formation leading to a drop in the pH of the reaction medium. As a result, the use of dextrins in aqueous sizing and/or coating compositions must be accompanied by the use of a buffer. Sodium sulphite has been proposed for this role. It has been found, however, that sodium sulphite is easily oxidised upon contact with air and by oxidants present in water formulations. Compositions obtained in this manner are therefore unstable with pH fluctuations resulting in an undesirable browning effect.

A further difficulty with paper sizing and coating compositions is the presence of impurities and, in particular, the presence of bacterial and/or fungal contamination. These impurities may originate from the water used to form the aqueous composition or from other contaminated ingredients (e.g. pigments, fillers, etc.). The presence of micro-organisms can cause compositions to ferment leading to instability and reduced shelf-life. Fermentation can also result in an undesirable colouration of the composition and in the production of volatile gases (such as $H_2S$) which have unpleasant odours.

A number of biocides have been suggested to tackle this problem. Unfortunately, the use of traditional biocides is rather complex. For instance, the type and number of spores present in a starch composition has to be determined before an appropriate biocide can be selected. The use of biocides therefore increases the level of technical expertise required for making up sizing and coating compositions. They cannot be pre-mixed to the initial starch composition as each user may require a different type of biocide in a different quantity. Thus, the use of traditional biocides adds to the amount of time necessary for the preparation of sizing and coating compositions and therefore raises the overall cost of the final product, effectively rendering the process uneconomical.

It is therefore apparent that an improved method of producing starch-based compositions for use in paper sizing and/or coating is required. The present invention provides such a method.

SUMMARY OF THE INVENTION

In a first aspect of the present invention, there is provided a method of preparing a starch-based composition, characterised in that it comprises the following steps:

(a) mixing a starch substrate with sodium perborate (wherein the substrate is preferably a thermally modified starch such as a dextrin);

(b) adding water to the mix of step (a) to form a slurry; and (c) pasting the slurry of step (b), provided that the method does not include, between steps (b) and (c), the step of adding an effective amount of hydrolytic enzyme to the slurry.

The sodium perborate is preferably mixed to the starch substrate in an amount, on a dry weight basis, of 0.01-1.25 parts, even more preferably 0.01-0.35 parts per 100 parts starch substrate.

In another aspect of the present invention, there is provided a method of preparing a paper sizing and/or coating composition, comprising the following steps:

(a) mixing a starch substrate with sodium perborate;

(b) adding water to the mix of step (a) to form a slurry;

(c) pasting the slurry of step (b); and (d) adding to the paste of step (c) one or more additional paper sizing and/or coating composition ingredients (such as thickeners, pigments, binders and additives), provided that the method does not include, between steps (b) and (c), the step of adding an effective amount of hydrolytic enzyme to the slurry.

According to one embodiment, both the above methods may further comprise the step of adding sodium and/or calcium carbonate to the starch substrate of step (a) or to the slurry of step (b).

In a further aspect of the present invention, there is provided a paper sizing and/or coating composition comprising the starch-based composition prepared according to the above method.

In a yet further aspect of the present invention, there is provided the use of a composition as defined above for sizing and/or coating paper and/or paper preparations.

In an additional aspect of the present invention, there is provided a process for sizing and/or coating paper and/or paper preparations comprising the step of applying to or incorporating into said preparation a composition as defined above.

In a final aspect of the present invention, there is provided a paper and/or paper preparation sized and/or coated with a composition as defined above, or prepared according to the process described above.

DETAILED DESCRIPTION

The present invention provides a method of preparing a starch-based composition, preferably for use in paper sizing and/or coating compositions, characterised in that it comprises the following steps:

(a) mixing a starch substrate with sodium perborate;

(b) adding water to the mix of step (a) to form a slurry; and (c) pasting the slurry of step (b), provided that the method does not include, between steps (b) and (c), the step of adding an effective amount of hydrolytic enzyme to the slurry.

The starch substrate may be a native starch, a starch derivative or a mixture of two or more thereof, wherein the term "starch derivatives" refers to any molecule produced by a modification or series of modifications (physical, chemical and/or genetic) to starch. It can be of any desired origin (potato, wheat, maize, rice, tapioca, pea, barley, sorghum, sago etc.) or can be a mix of starches of different origins. It may, if desired, comprise one or more waxy starches.

Preferably, the starch substrate will comprise at least one thermally modified starch. Even more preferably, the starch substrate will comprise at least one dextrin or dextrin derivative. Examples of suitable dextrins include white dextrin, yellow (or canary) dextrin and British gum. According to one embodiment, the starch substrate will be provided in powdered form. Preferably, the starch substrate will be in the form of a powdered maize white dextrin.

In a first step of the process of the present invention (step (a)), the starch substrate is mixed with sodium perborate. The term "sodium perborate" is used to refer not only to sodium perborate itself, but also to derivatives thereof such as sodium perborate tetrahydrate.

Using any available mixing method, sodium perborate should be added to the starch substrate in an amount, on a dry weight basis, of 0.01-1.25 parts, preferably 0.01-0.35 parts, even more preferably about 0.2 parts per 100 parts starch substrate. Although sodium perborate has previously been disclosed as an inhibitor of hydrolytic enzymes (EP1184413), it has now surprisingly been found to have, in addition to an advantageous buffering capacity (at pH 7-8), both a biocide and bleaching effect on starch compositions—even when added only in small quantities. The need for separate biocides and buffer compounds such as sodium sulphite can thus be eliminated.

In addition to sodium perborate, sodium and/or calcium carbonate may also be mixed to the starch substrate. Preferably, for 100 parts starch substrate, 0.01-0.6 parts sodium and/or calcium carbonate (on a dry weight basis) will be used. Even more preferably, 0.05-0.35 parts sodium and/or calcium carbonate will be used. Again, any known mixing method may be used.

The combination of sodium perborate and sodium and/or calcium carbonate in the method of the present invention has surprisingly been found to lead to reduced RAP formation. RAPs are retrograded amylose particles. When present in sizing or coating compositions, they prevent homogeneous distribution and lead to the appearance of undesirable marks on the paper surface.

When used, the sodium and/or calcium carbonate may be added in step (a) or step (b) of the process of the present invention. If added in step (a), it may be mixed to the starch substrate before, after or indeed simultaneously to the sodium perborate. If added in step (b), it may be added before, after or simultaneously to the water.

Water is added to the mix of step (a) to form a slurry. The water may be fresh water (e.g. demineralised water or tap water) or process water. The amount of water added will depend, to a large extent, on the desired nature and use of the end product. Nonetheless, the slurry will preferably comprise 0.5-50% by weight dry substance. Even more preferably, it will comprise 1-40% by weight dry substance. The water and mix of step (a) can be blended using any known methods.

In a third step of the process of the present invention (step (c)), the slurry of step (b) is pasted. Pasting involves heating under high shear conditions. It may be carried out in batch or as a continuous process. Preferably, pasting will be carried out at 80-140° C., even more preferably at 90-130° C., for 1 to 45 minutes. Both heating and stirring can be achieved using any methods known in the art.

It has surprisingly been found that, whereas other biocides are inhibited under pasting conditions (due, in particular, to the high temperatures), sodium perborate continues to have a strong sterilising effect. It also continues to act as a buffer and a bleaching agent. Accordingly, the paste obtained in step (c) will have good pH stability, a desirable white colour and will be less susceptible to microbial growth and fermentation. Each of these properties makes the product of the above described method highly suitable for use in the preparation of starch based-compositions such as paper sizing and/or coating compositions.

Thus, the present invention further provides a method for preparing paper sizing and/or coating compositions comprising preparing the starch paste as described above and adding to said paste one or more additional paper sizing and/or coating composition ingredients.

Paper Sizing Compositions

Paper sizing compositions are used to improve a paper's strength and its resistance to penetration by liquids such as water and inks.

Additional ingredients for use in such compositions will be known to the skilled person. They may include, for example, sizing agents (such as alkyl ketene dimers and/or alkenyl succinic anhydride), dewatering agents (e.g. organic salts such as alum) and one or more optional additives. Examples of such additives include: surfactants (e.g. cationic surfactants, anionic surfactants, non-ionic surfactants and fluorinated surfactants), hardeners (e.g. active halogen compounds, vinylsulfone compounds, epoxy compounds, etc.), dispersing agents (e.g. polyacrylates, polyphosphates, polycarboxylates, etc.), flowability improvers, lubricants (e.g. calcium, ammonium and zinc stearate, wax or wax emulsions, glycols, etc.), antifoamers (e.g. octyl alcohol, silicone-based antifoamers, etc.), releasing agents, foaming agents, penetrants, optical brighteners (e.g. fluorescent whiteners), preservatives (e.g. benzisothiazolone and isothiazolone compounds), yellowing inhibitors (e.g. sodium hydroxymethane sulfonate, sodium p-toluenesulfinate, etc.), ultraviolet absorbers (e.g. benzotriazole compounds having a hydroxydialkylphenyl group at the 2 position), antioxidants (e.g. sterically hindered phenol compounds), insolubilisers, antistatic agents, pH regulators (e.g. sodium hydroxide, sulfuric acid, hydrochloric acid, etc.), water-resisting agents (e.g. ketone resin, anionic latex, glyoxal, etc.), wet and/or dry strengthening agents (e.g. glyoxal based resins, oxidised polyethylenes, melamine resins, urea formaldehyde, etc.), gloss-ink holdout additives, grease and oil resistance additives, levelling and evening aids (e.g. polyethylene emulsions, alcohol/ethylene oxide, etc.), etc.

The amount of each of these compounds to be added, if at all, will be determined in accordance with standard practice and with the desired properties of the sizing composition to be produced in mind. In any event, it should have a total content of 0.1-2% by weight dry substance. The remaining 99.9-98% will consist essentially of water and/or other suitable fluids such as solvents. If used, solvents will preferably be selected amongst organic solvents such as methanol and/or ethanol. Ideally, however, water alone will be used.

Paper Coating Compositions

Paper coating compositions are used, amongst other things, to improve appearance and feel (e.g. improved gloss, slickness, brilliance, and colour), printability (e.g. smear-resistance, ink-absorption and adhesion) and strength. They typically comprise at least one pigment, a binder and a thickener.

Thickener compounds include all compounds which, in solution, are capable of causing an increase in viscosity. Examples of such compounds include cellulose esters (such as CMC, hydroxyethyl cellulose, hydroxypropyl cellulose, ethylhydroxyethyl cellulose and methyl cellulose), alginates (such as sodium alginate), xanthan, guar, native or modified starches and synthetic polymers.

Examples of pigments, both natural and synthetic, include: clays such as structured and calcined clays, hydrated aluminosilicates (such as kaolin clay), natural and synthetic calcium carbonate, calcium sulphate, silicas, precipitated silicas, titanium dioxide, alumina, aluminium trihydrate, plastic (polystyrene) pigments, satin white, talc, barium sulphate and zinc oxide.

Examples of binders suitable for use in the composition of the present invention include: carbohydrate binders including starch binders (such as oxidised or esterified starch) and cellulose binders (such as CMC and hydroxyethyl cellulose), protein binders (such as casein, gelatine and soya protein) and synthetic binders, especially latex binders (such as copolymer latexes, acrylic polymer latexes, vinyl polymer latexes) and synthetic resin binders.

As for sizing compositions, the properties of the final coating composition can be modified or enhanced with the use of one or more optional additives, examples of which are listed above.

Again, the amount of each component to be added will be determined in accordance with standard practice and with the desired properties of the coating composition in mind. Preferably, it should have a total content of 10-25% by weight dry substance. The remaining 75-90% will consist essentially of water and, optionally, other suitable fluids as listed above.

Paper sizing and/or coating composition prepared according to the above method and their use in sizing and/or coating paper and/or paper preparations also form part of the present invention.

Sizing can be accomplished at the wet end by incorporating a sizing composition into the paper preparation ("internal sizing") and/or at the size press by applying the composition to one or both surfaces of the paper product ("surface sizing"), e.g. by coating.

Coating compositions can be applied to paper products on the sheet forming machine or on a separate coating machine. Methods of applying said compositions to paper products are well known in the art. They include, for example, air knife coating, rod coating, bar coating, wire bar coating, spray coating, brush coating, cast coating, flexible blade coating, gravure coating, jet applicator coating, extrusion coating, short dwell coating, slide hopper coating, curtain coating, flexographic coating, size-press coating, gate roll coating, reverse roll coating and transfer roll coating. According to the quality of paper desired, it can be coated only once or a plurality of times, provided that at least one of the coatings is in accordance with the present invention. If more than one coating is to be applied, only one or both surfaces of the paper product may be coated.

As used above, the terms "paper" and "paper products" are used interchangeably to refer to sheet materials of any thickness (including, for example, paper board, cardboard and corrugated board) at any stage during its production, including at the paper web stage. A paper web is the continuous ribbon of paper as found in paper machines, i.e. before cutting into sheets.

The term "paper preparation" refers to the fibrous slurry or pulp used in the formation of paper webs or sheets.

Thus, the present invention further provides a process for sizing and/or coating paper and/or paper preparations comprising the step of applying to or incorporating into said paper and/or paper preparation a composition as defined above. Paper and/or paper preparations prepared according to this process also form part of the invention.

In summary, it has surprisingly been found that sodium perborate has a unique and combined biocide, buffering and bleaching effect on starch or starch-based compositions to which it is added (in other words, it limits microbiological development, improves pH stability during storage and prevents colouring and smell development). This effect is maintained during slurry formation and pasting of the starch or starch-based composition and in products based thereon, for example sizing and/or coating compositions. As a result, there is no need to add a biocide to these final compositions and, where other ingredients are used, there will be a lesser need to ensure that these are contaminant free. What is more, sodium perborate can be added to starch or starch-based compositions at an early stage of the preparation process thus reducing any requirements for technical expertise at the paper plant stage: the dry starch mix can simply be added to water and pasted without the need to select and add any biocides.

The invention will now further be described by way of the following non-limiting examples.

EXAMPLE

Effect of Sodium Perborate on Starch Compositions

The following blends were prepared (A and B being for comparative purposes only) using a dextrin obtainable from Cerestar under the product name C*FILM TCF07311:

A—Dextrin+2 kg/T Sodium Sulphite ($Na_2SO_3$);

B—Dextrin+0.70 kg/T Calcium Carbonate ($CaCO_3$); and

C—Dextrin+2 kg/T Sodium Perborate ($NaBO_3$, $4H_2O$).

The powder blends were prepared in the ratios defined above. Slurries were then prepared at 30% dry substance with demineralised water. Samples of each slurry were stored for 7 days, under magnetic stirring (450-500 rpm), both at room temperature and at 35° C.

pH evolution, the presence of oxidants and the formation of odour and foam were monitored. The results are set out in Tables 1 (room temperature) and 2 (35° C.), below.

pH

At room temperature, when using sodium perborate, a good pH stability was obtained, even after 7 days' storage. By comparison, when using sodium sulfite and calcium carbonate, an important decrease in pH was observed after only three days' storage.

At 35° C., similar observations were made. The pH of the slurry containing sodium perborate remained stable for much longer (a decrease was only noted after 7 days' storage) than that of the slurries containing sodium sulfite or calcium carbonate. Indeed, for the latter two, a pH drop was observed even after only 1 day's storage.

Odour

For the sodium perborate slurry, no unpleasant odour was registered until day 7. Even then, the odour was only mild. For the two other slurries (sodium sulfite and calcium carbonate), strong smells were observed as early as day 3. This was the same at both room temperature and 35° C.

Foam

No foam formation was noted for the sodium perborate slurry. For the calcium carbonate slurry, however, foam was observed after three days' storage at 35° C. (this is thought to be linked to the decrease in pH which partly neutralizes the calcium carbonate and leads to a release of carbon dioxide).

Oxidants

The presence of oxidants was only observed for the slurry containing sodium perborate. Oxidation has both a sterilizing and a bleaching effect.

The sterilizing effect of sodium perborate was tested by measuring contaminant levels after overnight storage (at room temperature and 35° C.). The results are set out in Table 3, above (where: TC=total count; AE=aerobic; AN=anaerobic; Y=yeasts; and M=moulds).

Contamination

The bacteriological analysis confirmed the chemical one, namely that sodium perborate can act as a biocide. It was indeed observed that, after a full days' storage at room temperature or at 35° C., the starch slurry containing sodium perborate was still clean whereas the two other slurries (containing sodium sulfite or calcium carbonate) were already highly contaminated.

It was also observed that by increasing the sodium perborate concentration, the levels of oxidants produced could be maintained thereby extending the observed biocide effect.

TABLE 1

|  | Slurry preparation (Do) | | | $1^{st}$ storage day (D + 1) | | | $3^{rd}$ storage day (D + 3) | | | $7^{th}$ storage day (D + 7) | | |
| --- | --- | --- | --- | --- | --- | --- | --- | --- | --- | --- | --- | --- |
|  | pH | Oxidant | Odour | pH | Oxidant | Odour | pH | Oxidant | Odour | pH | Oxidant | Odour |
| Blend A | 6.58 | 0 | 0 | 6.00 | 0 | 0 | 4.82 | 0 | ++ | 5.40 | 0 | ++ |
| Blend B | 5.92 | 0 | 0 | 6.40 | 0 | 0 | 4.45 | 0 | ++ | 4.11 | 0 | ++ |
| Blend C | 6.89 | ++ | 0 | 6.68 | ++ | 0 | 6.68 | ++ | 0 | 6.00 | 0 | + |

TABLE 2

|  | Slurry preparation (Do) | | | $1^{st}$ storage day (D + 1) | | | $3^{rd}$ storage day (D + 3) | | | $7^{th}$ storage day (D + 7) | | |
| --- | --- | --- | --- | --- | --- | --- | --- | --- | --- | --- | --- | --- |
|  | pH | Oxidant | Odour | pH | Oxidant | Odour | pH | Oxidant | Odour | pH | Oxidant | Odour |
| Blend A | 6.60 | 0 | 0 | 5.97 | 0 | 0 | 5.38 | 0 | ++ | 4.06 | 0 | ++ |
| Blend B | 6.07 | 0 | 0 | 4.66 | 0 | 0 | 4.04 | 0 | ++ (foam) | 3.81 | 0 | ++ |
| Blend C | 6.91 | ++ | 0 | 6.70 | ++ | 0 | 6.70 | ++ | 0 | 4.60 | 0 | + |

TABLE 3

|  | Slurry preparation (Do) | | | | | After overnight storage (D + 1) | | | | | | | | | |
| --- | --- | --- | --- | --- | --- | --- | --- | --- | --- | --- | --- | --- | --- | --- | --- |
|  | | | | | | At room temperature | | | | | At 35° C. | | | | |
|  | TC | AE | AN | Y | M | TC | AE | AN | Y | M | TC | AE | AN | Y | M |
| Blend A | 1.00E+03 | 0 | 0 | 0 | 0 | 1.44E+04 | 0 | 0 | 240 | 0 | 7.90E+05 | 0 | 24 | 0 | 0 |
| Blend B | 1.54E+03 | 1 | 0 | 0 | 40 | 8.96E+03 | 0 | 0 | 5.20E+03 | 60 | 8.32E+06 | 1 | 2 | 1.00E+02 | 0 |
| Blend C | 7.00E+01 | 3 | 0 | 0 | 20 | 0 | 0 | 0 | 0 | 0 | 1.30E+02 | 0 | 0 | 0 | 0 |

The invention claimed is:

1. A method of preparing a starch-based paper sizing or paper coating composition, comprising the following steps:
   (a) mixing a thermally modified starch substrate with sodium perborate;
   (b) adding water to the mix of step (a) to form a slurry;
   (c) pasting the slurry of step (b) at a temperature of 80-140° C.; and
   (d) adding to the paste of step (c) one or more additional paper sizing and/or coating composition ingredients,
   provided that the method does not include the step of adding an effective amount of hydrolytic enzyme to the slurry.

2. The method of claim 1, wherein the thermally modified starch is dextrin.

3. The method of claim 1, further comprising mixing the starch substrate of step (a) or the slurry of step (b) with sodium carbonate and/or calcium carbonate.

4. The method of claim 1, wherein, in step (a), 0.01-1.25 parts sodium perborate, on a dry weight basis, are mixed to 100 parts starch substrate.

5. The method of claim 1, wherein, in step (a), 0.01-0.35 parts sodium perborate, on a dry weight basis, are mixed to 100 parts starch substrate.

6. The method of claim 1, wherein the slurry of step (b) comprises 0.5-50% weight dry substance.

7. The method of claim 1, wherein step (c) is carried out at a temperature of 90-130° C.

8. The method of claim 7, wherein step (c) lasts for 1-45 min.

* * * * *

UNITED STATES PATENT AND TRADEMARK OFFICE
CERTIFICATE OF CORRECTION

| | | |
|---|---|---|
| PATENT NO. | : 7,674,354 B2 | Page 1 of 1 |
| APPLICATION NO. | : 11/571069 | |
| DATED | : March 9, 2010 | |
| INVENTOR(S) | : Berckmans et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 510 days.

Signed and Sealed this
Eleventh Day of January, 2011

David J. Kappos
*Director of the United States Patent and Trademark Office*